United States Patent [19]

Klenk et al.

[11] Patent Number: 5,513,521
[45] Date of Patent: May 7, 1996

[54] MISFIRE DETECTION BASED ON CRANKSHAFT FLUCTUATION

[75] Inventors: Martin Klenk, Backnang; Wolfgang Wimmer, Erlenbach, both of Germany

[73] Assignees: Robert Bosch GmbH, Stuttgart; Audi AG, Ingolstadt, both of Germany

[21] Appl. No.: 374,581

[22] PCT Filed: Apr. 28, 1994

[86] PCT No.: PCT/DE94/00470

§ 371 Date: Jan. 17, 1995

§ 102(e) Date: Jan. 17, 1995

[87] PCT Pub. No.: WO94/27132

PCT Pub. Date: Nov. 24, 1994

[30] Foreign Application Priority Data

May 17, 1993 [DE] Germany .......................... 43 16 409.9

[51] Int. Cl.$^6$ .................................................. G21M 15/00
[52] U.S. Cl. .................................................. 73/117.3; 73/116
[58] Field of Search .................................. 73/116, 117.3, 73/118.1

[56] References Cited

U.S. PATENT DOCUMENTS 5,263,365 11/1993 Müller et al. .
5,287,737 2/1994 Osawa et al. ........................ 73/117.3
5,307,671 5/1994 Akase ................................... 73/117.3
5,361,629 11/1994 McCombie ......................... 73/117.3
5,377,536 1/1995 Angermaier et al. ................ 73/116

FOREIGN PATENT DOCUMENTS 4009285  12/1990  Germany .
4138765  7/1992  Germany .
WO90/15235  12/1990  WIPO .

Primary Examiner—Richard Chilcot
Assistant Examiner—Max H. Noori
Attorney, Agent, or Firm—Walter Ottesen

[57] ABSTRACT

A method for detecting misfires in an internal combustion engine is given wherein: uneven-running values are detected which are a measure for the changes of the crankshaft rpm of the engine with the changes being caused by misfires; the spacing between bands of uneven-running values is computed; a check is made as to whether the computed band spacing is greater than a pregiven threshold spacing and, if this is the case, this data is used as an indication that misfires and not disturbances of the crankshaft rpm are present; in the case that no significant band spacing greater than the threshold spacing is determined and, in addition, uneven-running values drop below a pregiven negative threshold value, this is used as an indication that disturbances of the crankshaft rpm are present and the detection of misfires is interrupted. With this method, it is possible to reliably distinguish large uneven-running values caused by misfires from corresponding values which are caused by disturbances as they are transmitted to the engine from the drive train.

5 Claims, 3 Drawing Sheets

FIG. 4
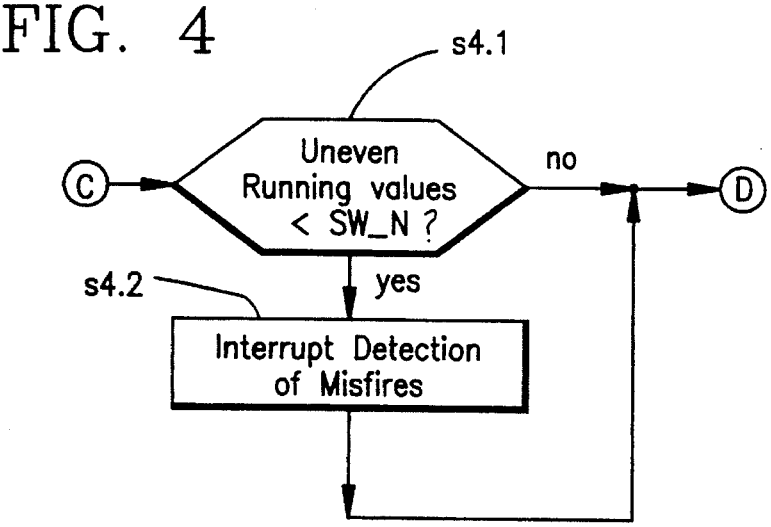
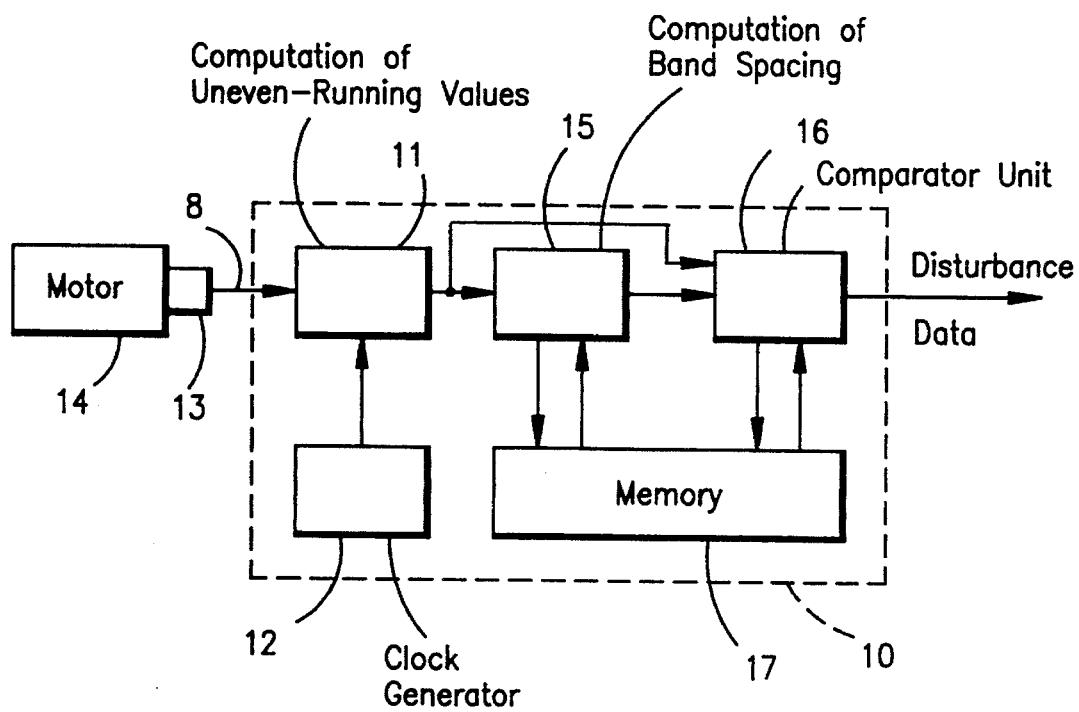
FIG. 5

5,513,521

MISFIRE DETECTION BASED ON CRANKSHAFT FLUCTUATION

FIELD OF THE INVENTION

The invention relates to a method and an arrangement for detecting combustion misfires in an internal combustion engine which are based on an evaluation of crankshaft-rpm fluctuations. A disturbance of the crankshaft rpm can take place because of reactions of the vehicle drive train, for example, when the following are present: extreme unevenness of the road surface, bucking driving operation or alternating tire slip on and tire adherence to the road surface. Disturbances of this kind are distinguished from crankshaft rpm fluctuations when combustion misfires occur and especially also from multiple misfires. Multiple misfires are understood to mean the simultaneous absence of combustion in several cylinders.

BACKGROUND OF THE INVENTION

Numerous methods have become known for detecting combustion misfires. Of these, only those are of interest in the following which operate with so-called uneven-running values. Values of this kind are essentially a measure for rapid changes of the crankshaft rpm of the engine. As a rule, uneven-running values are specified with respect to sign in that a rapid drop of rpm leads to a large positive uneven-running value for the affected cylinder whereas the uneven-running values of normal combustions are significantly less and are possibly negative. This rapid drop of rpm can be caused by a combustion misfire. If the actual uneven-running value for a cylinder exceeds a threshold value, which is typically read out of a characteristic field in dependence upon actual values of operating variables, then this is a sign for a misfire in the particular cylinder. When forming uneven-running values, an opposite sign application can be used in an equivalent manner in the sense that a negative uneven-running value corresponds to a rapid reduction of rpm. In this case, a misfire is detected in that the corresponding uneven-running value drops below a negative threshold value.

An overview of various methods and arrangements for detecting combustion misfires is provided in DE-A-40 09 285 and in DE-A-41 38 765. Reference is made hereto for the sake of brevity. In the present invention, it is not significant as to how the uneven-running values are formed; instead, what is of concern is how, with the aid of any desired determined uneven-running values, a reliable decision can be made as to whether misfires are present or not.

It is problematic in the detection of misfires that not only misfires lead to rpm fluctuations but that such fluctuations are also transmitted to the engine by vibrations of the vehicle drive train. Such vibrations are especially caused by unevenness of the road surface.

Road surface unevenness can be determined with the aid of the signals of an acceleration sensor on the affected vehicle or with the aid of a signal which monitors fluctuations of the rpm of a wheel. If the determined values exceed a pregiven threshold value, concern can be had that the detection of misfires is influenced disadvantageously and for this reason the misfire detection is interrupted (preferably the computation of uneven-running values is already interrupted) until the above-mentioned signals again drop below the particular threshold value. Corresponding methods and arrangements are however, tied to increased complexity and increased costs.

SUMMARY OF THE INVENTION

It is an object of the invention to provide a method and an arrangement for detecting combustion misfires in an internal combustion engine which can determine exclusively with the aid of uneven-running values whether the detection of misfires is disturbed by rpm fluctuations which are transmitted from the drive train to the engine.

The following descriptions relate to the usual case referred to initially herein in accordance with which the uneven-running values assume increased positive values in the case of a misfire. For uneven-running values, which are given an opposite sign, the given sign and the larger/smaller relations in the following descriptions are to be reversed in sense, as required.

The invention is based on the recognition that the value range of uneven-running values splits into at least two bands in the case of misfires. In the case of rpm fluctuations caused via the drive train, only an expansion of the value range occurs without splitting into such bands. According to the invention, the extent of a possible band split is investigated. If a split is determined and if this split is greater than a pregiven threshold spacing between the bands of uneven-running values, then this data is evaluated as an indication that misfires are present.

If no band split, which is to be noted, is determined, then the question is raised whether possibly rpm fluctuations are present which make it appear advisable to interrupt the detection of misfires. In accordance with an advantageous further embodiment of the invention, and when no significant band split is determined, a check is made as to whether a widening of the uneven-running value range is present in that a check is made as to whether uneven-running values drop below a pregiven negative uneven-running threshold value. If this is the case, a conclusion is drawn that rpm fluctuations are caused by the drive train and the misfire detection is interrupted.

In the following, when the discussion pertains to drive train vibrations, then only such vibrations are meant which are not caused by the operation of the engine but those vibrations are meant which, in contrast, act on the instantaneous rpm of the engine.

BRIEF DESCRIPTION OF THE DRAWINGS

The invention will now be described with reference to the drawings wherein:

FIG. 4 is a flowchart for explaining a further embodiment of the method of the invention in accordance with which it is possible to reliably interrupt the detection of misfires; and, FIG. 5 is a block diagram for explaining an embodiment of an arrangement according to the invention.

DESCRIPTION OF THE PREFERRED EMBODIMENTS OF THE INVENTION

Figures 1A, 1B, 1C, 1D:
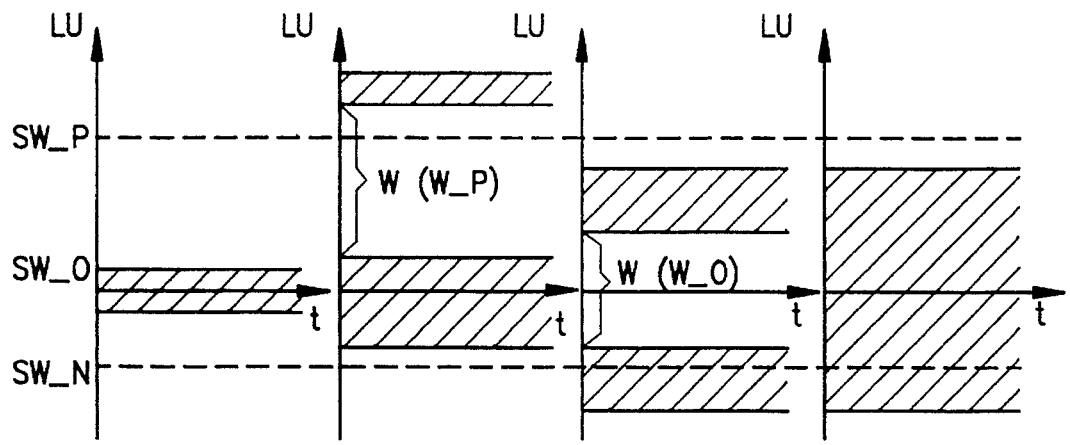
FIGS. 1a to 1d are diagrams relating to the time-dependent distribution of uneven-running values for the following cases: (a) misfire-free operation of the engine without disturbances by drive train vibrations; (b) misfire in one cylinder; (c) multiple misfires with every second combustion of the engine omitted; (d) misfire-free engine operation with disturbances caused by drive-train vibrations.

FIG. 1 shows the value range of uneven-running values as a function of time for four different cases. Reference is made to DE-A-40 09 285 and DE-A-41 38 765 as to examples for computing uneven-running values. When all cylinders of an internal combustion engine operate properly, the uneven-running values fluctuate slightly about the value zero for the individual cylinders. The uneven-running values are not precisely equal to zero because the combustion does not take place precisely in the same manner in all cylinders. Accordingly, a certain but relatively narrow value range of uneven-running values results with zero as the mean value as shown in FIG. 1a.

When a single cylinder exhibits misfires in a multicylinder internal combustion engine, then relatively high uneven-running values occur for this cylinder which, in turn, fluctuate in a relatively narrow band. At the same time, the band, which lies about the uneven-running value zero, shifts on average slightly to negative values such that the mean value of all uneven-running values is essentially zero because the other cylinders exhibit increased negative uneven-running values in order to compensate the slowing of the crankshaft rpm, which is caused by the misfires so as to maintain a constant mean rpm. This case is shown in FIG. 1b.

In contrast to FIG. 1b, FIG. 1c shows the case of multiple misfires. In this embodiment, every second combustion of the engine is omitted. The omitted cylinders exhibit positive uneven-running values; whereas, the cylinders wherein no misfires occur exhibit negative uneven-running values. The two value bands then lie symmetrically about the uneven-running value zero.

Finally, FIG. 1d shows the case of an increased widening of the band of uneven-running values according to FIG. 1a. This expansion, which lies symmetrical to the uneven-running value zero, is caused by drive train vibrations as they are caused by unevenness of the road surface and transmitted via the wheels and the drive train to the engine.

In FIG. 1, three uneven-running threshold values SW_P, SW_0 and SW_N are indicated. The threshold values SW_P and SW_N are, in general, dependent upon the instantaneous operating state of the engine. The threshold value SW_P is then a positive threshold value as it had been used in methods up to now in order to detect whether a cylinder exhibits misfires. As can be seen from FIGS. 1b and 1c, this threshold value is exceeded in the case of misfires in a single cylinder but not in the case of multiple misfires. In view of this problematic, U.S. Pat. No. 5,263,365 discloses a method wherein the detection threshold for misfires is reduced when multiple misfires are assumed.

The positive threshold value SW_P cannot only be exceeded in the case of misfires but also then when very intense disturbances because of drive train vibrations are present. In the case shown in FIG. 1d, these disturbances are, however, not so strong that the positive threshold value SW_P would be exceeded. In contrast, there is a drop below the negative threshold value SW_N, which is selected so as to be less in absolute amount. With the aid of this threshold value, even relatively small drive train vibrations can be detected which, however, are already so large that they make the detection of misfires unreliable. However, the misfire detection is only then interrupted when, in addition to a drop below the negative threshold value SW_N, still another condition is satisfied.

This other condition is related to the spacing W of the two bands of uneven-running values in the cases of FIGS. 1b and 1c. If the spacing W is greater than a pregiven threshold spacing, which is dependent generally on the operating state of the engine, the presence of misfires is recognized independently of whether there is a drop below the negative threshold value SW_N (as in the case of FIG. 1c) or not (as in the case of FIG. 1b). If, in contrast, the spacing W is less than the threshold spacing or especially if no spacing can be detected (as in case of FIG. 1d) and if, in addition, there is a drop below the negative threshold value SW_N, then the detection of misfires is interrupted; that is, no output with respect to misfires occurs.

The spacing between an upper and a lower band of uneven-running values can, in the case of misfires, be easily determined in a single cylinder in that the difference between the smallest value above the positive threshold SW_P and the largest value below the positive threshold SW_P is determined. However, if the upper band overlaps the positive threshold SW_P or lies entirely below (as in the case of FIG. 1c), then this type of band determination is unsuccessful. The difference between the smallest positive value in the upper band and the largest negative value in the lower band can then be formed. That is, the threshold SW_0 shown in FIG. 1 is used in a similar manner as the threshold SW_P in the previous case just referred to.

A further possibility for determining whether a band gap is present comprises inputting a bandwidth which corresponds to the threshold spacing referred to above. This band is then shifted stepwise over all uneven-running values and a count is made in each case as to how many uneven-running values are present within the pregiven bandwidth. If a range is found for which, for example, the following is applicable: of 100 uneven-running values, which are detected over the observed time span, fewer than two lie within the pregiven bandwidth, then the assumption is made that a band gap is present having at least the width of the threshold spacing.

In a similar manner, for the determination as to whether the uneven-running values, which are detected in the observed time span, exhibit a band gap, the position of the threshold can be moved to lower values proceeding from the positive value SW_P and the difference in each case between the smallest uneven-running value above the threshold and the largest uneven-running value below the threshold can be formed. If a position of the threshold is found for which this difference exceeds the pregiven threshold spacing, then a band gap lies within the uneven-running values having at least the width of the threshold spacing.

In order to find reliable values for the above-mentioned band spacing W, two examples are now discussed in greater detail.

According to the first example, the minimum uneven-running value $MINLU_1$ above a threshold value S (threshold value SW_P or threshold value SW_0) is determined as follows as it applies to a combustion being applicable having the advancing number i:

if LU[i]≧S and LU[i]>MINLU[i−1], then MINLU[i]= c1.LU[i]+(1−c1).MINLU[i−1];

if LU[i]≧S and LU[i]≦MINLU[i−1], then MINLU[i]= c2.LU[i]+(1−c2).MINLU[i−1];

if LU[i]<S, then MINLU[i]=MINLU[i−1].

In the above, LU[i] is the uneven-running value for the combustion having the number i. The filter constants c1 and c2 have values lying between zero and 1 and, preferably c2>c1 for these filter constants. This has the consequence that the value MINLU[i] can move away from the threshold S only for a significantly pronounced band gap; whereas, this value rapidly approximates the threshold when, for disturbances because of drive train vibrations, an uneven-running value is generated close to the threshold S.

In the same manner, a value MAXLU[i] is formed; that is, a measure for the highest reliably occurring uneven-running value below the threshold S.

From the values MINLU[i] and MAXLU[i], the corresponding band spacing W[i] is computed for the particular combustion i as:

$$W[i] = \text{const.}(\text{MINLU}[i] - \text{MAXLU}[i])$$

If the value 1 is set for the constant (const) and if the value zero is used as start values for MINLU[i] and MAXLU[i], then, with the occurrence of a band gap in accordance with FIGS. 1b and 1c, the band spacing W[i] is first zero; however, this then soon increases to the value W shown in FIG. 1. Other values for the constant (const) facilitate an easy adaptation to different applications for the same computation method in each case.

In accordance with a second embodiment, a specific number of uneven-running values is collected, for example, for 100 combustions (this can happen continuously or, in a simpler manner, after each of the pregiven number of combustions). Of all detected values, the minimum value above the threshold S is detected as a measure MINLU; whereas, the maximum value below the threshold value S is detected as MAXLU. From the values MINLU and MAXLU, the band spacing W is determined in the same manner as for the first example. For the particular new computation of spacings W[i], a filtering can still take place in accordance with:

$$W[i] = c \cdot W[i-1] + (1-c) \cdot \text{const.}(\text{MINLU}[i] - \text{MAXLU}[i])$$

having a filter constant $0 < c < 1$. The sequential new-computation steps are numbered by the index i. If all uneven-running values lie on one side of the threshold S, then the value for the band spacing is set to zero.

Figure 2:
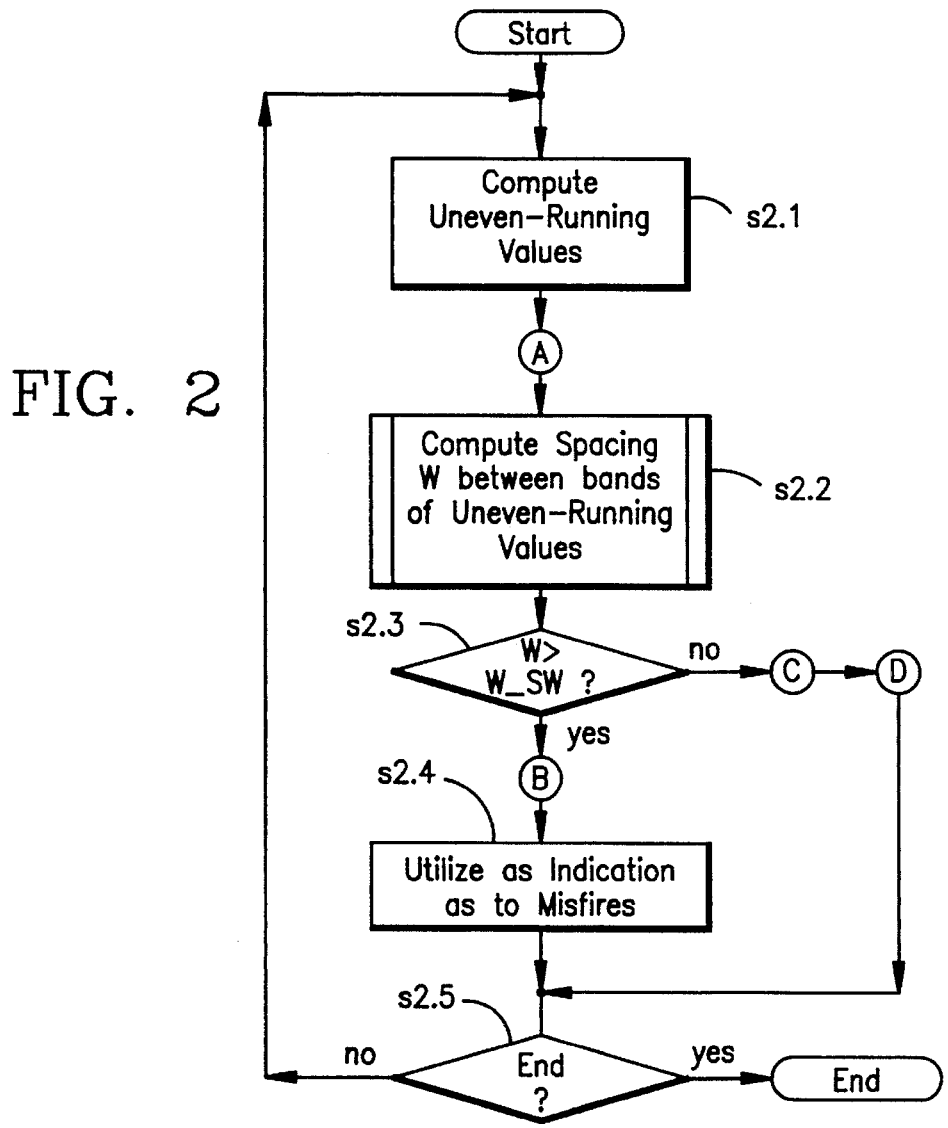
FIG. 2 is a flowchart providing an overview as to an embodiment of the method of the invention.
Figure 3:
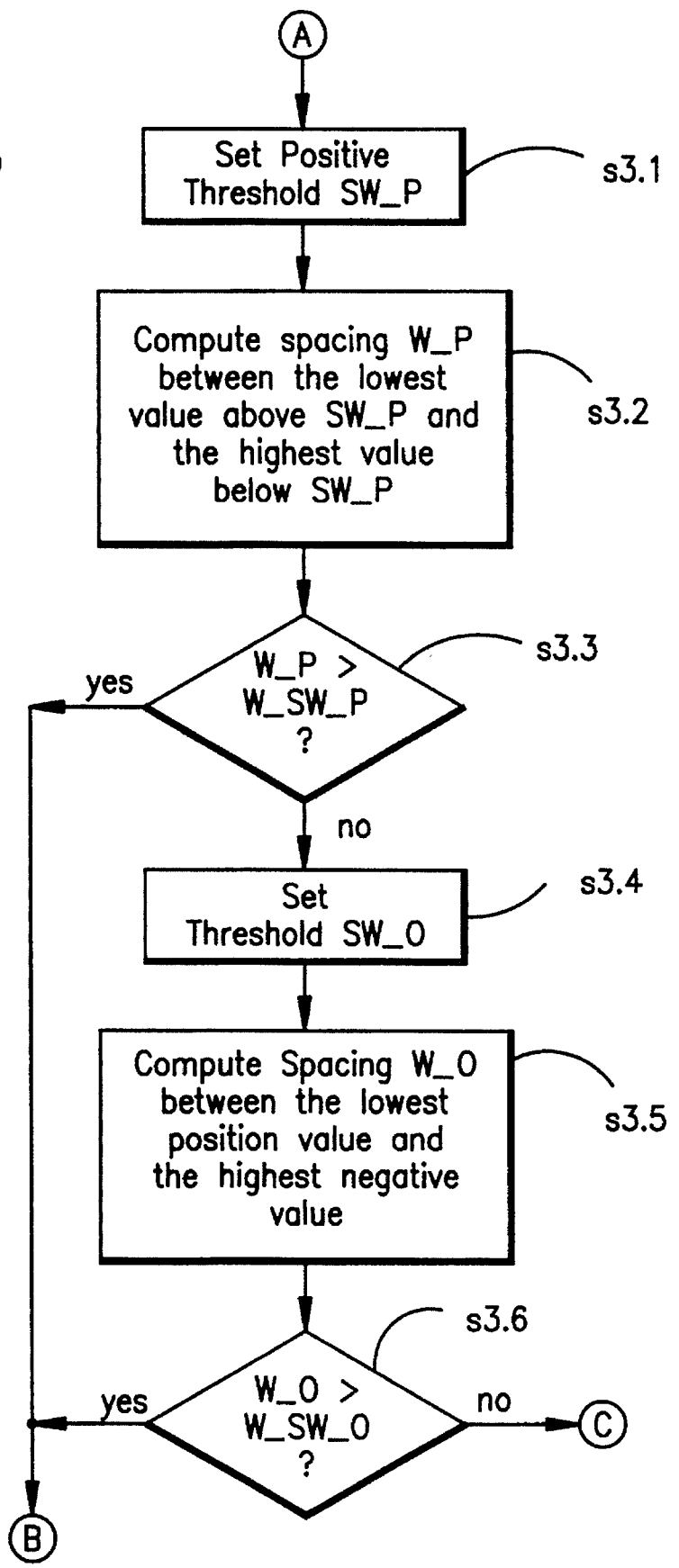
FIG. 3 is a flowchart directed to a specific example to determine whether uneven-running values are split into bands.

The procedures explained with respect to FIGS. 1a to 1d are now presented in greater detail with respect to the flowcharts of FIGS. 2 to 4.

In accordance with FIG. 2, uneven-running values are computed in a step S2.1. After passing through the mark A, the band spacing between the uneven-running values is computed in a subprogram in step S2.2. In a step S2.3, a check is made as to whether the computed spacing W exceeds a threshold W_SW. If this is not the case, then an end step S2.5 is reached via two marks C and D. Otherwise, a step S2.4 follows via a mark B wherein the fact is utilized as data that the band spacing is greater than the threshold spacing W_SW. This provides an indication that misfires are present. This data then can be coupled with additional data for final detection of misfires. The end step S2.5, already referred to above, follows the step S2.4 and a check is made in step S2.5 as to whether the detection of misfires should be ended, for example, when the engine comes to standstill. If this is not the case, then the step S2.1 follows again; whereas, otherwise, the method is ended.

FIG. 3 shows a more specific example for the sequence of the method between the marks A, B and C. In a step S3.1 after the mark A, the positive threshold SW_P is set. In a next step S3.2, the spacing W_P between the lowest uneven-running value above SW_P and the next highest value below SW_P is computed. In a step S3.3, a check is made as to whether the computed spacing W_P exceeds a threshold spacing W_SW_P. If this is the case, then the mark B is reached immediately. Otherwise, in a step S3.4, the threshold SW_0 is set. In a step S3.5, the spacing W_0 between the smallest positive and the smallest negative uneven-running value (that is, the highest) is computed. In a step S3.6, an inquiry is made as to whether the computed spacing W_0 exceeds a pregiven threshold spacing W_SW_0. If this is the case, the mark B is reached, otherwise the mark C is reached.

FIG. 4 relates to a detail sequence as it continues at the mark C, that is, as it then follows when no band spacing greater than a threshold spacing is determined between the uneven-running values. The sequence operates to decide whether the misfire detection should be interrupted because of disturbing drive train vibrations. In a step S4.1, a check is made as to whether uneven-running values lie below the negative uneven-running threshold value SW_N. If this is not the case, then the mark D in FIG. 2 is reached immediately. Otherwise, in a step S4.2, the detection of misfires is interrupted. The detection of misfires is again resumed with the entry of a pregiven condition, for example, when no uneven-running value lies any more below the negative threshold value SW_N or when a pregiven time span has elapsed or a pregiven number of crankshaft revolutions is reached.

FIG. 5 shows an embodiment for an arrangement 10 for detecting misfires according to the invention. The arrangement 10 includes a computation unit 11 for the uneven-running values which receives a fixed clock signal from a clock transducer 12 as well as a crankshaft angle signal Θ from an angle transducer 13 on an internal combustion engine 14. The computation unit outputs the computed uneven-running values to a unit 15 for computing the spacing W between bands of uneven-running values. The unit 15 receives an uneven-running threshold value from a memory 17 and emits its output signal to a comparator unit 16 which receives a threshold spacing pregiven by the memory 17 and compares the value received from the spacing computation unit 15 to the threshold spacing. If it results that no significant band gap is present between the uneven-running values, then a check is made by the comparator unit 16 as to whether the uneven-running values, which are computed by the unit 11, drop below a negative threshold value pregiven by the memory 17. If negative uneven-running values occur below this threshold without a band gap within the uneven-running values being determined, then the comparator unit 16 outputs data as to the presence of disturbances caused by vibrations of the drive train. With this data, the detection of misfires is interrupted. The thresholds supplied by the memory 17 are, in general, dependent upon the instantaneous operating state of the engine.

We claim:

1. A method for detecting misfires in an internal combustion engine, the method comprising the steps of:

detecting uneven-running values LU which are a measure for the changes of crankshaft rpm of the engine caused by misfires;

computing a spacing W between bands of uneven-running values; and, making a check as to whether the computed spacing W between the bands is greater than a pregiven threshold spacing (W_SW) and, if this is the case, using this data as an indication as to whether misfires and not disturbances of the crankshaft rpm are present.

2. The method of claim 1, comprising the further step of computing the spacing between the two bands of uneven-running values by carrying out the following substeps:

pregiving a positive uneven-running threshold value (SW_P);

determining the lowest uneven-running value, which appears to be reliable and is above this threshold value;

determining the highest uneven-running value, which appears to be reliable and is below this threshold value; and, forming the difference between the two determined values and using said difference as a measure for the band spacing about the positive uneven-running threshold value.

3. The method of claim 2, comprising the further step of comparing the computed band spacing to a threshold spacing (W_SW_P) and then, if the band spacing is less than the threshold spacing, the method continuing with the steps of:

inputting the uneven-running threshold value zero (SW_0);

determining the lowest positive uneven-running value, which appears to be reliable;

determining the highest negative uneven-running value, which appears to be reliable;

forming the difference between the two determined values and using said difference as a measure for the band spacing about the uneven-running threshold value zero; and, comparing the computed band spacing to a threshold spacing (W_SW_0).

4. The method of claim 1, wherein: when no band spacing greater than the threshold spacing corresponding thereto is determined, the method continues with the following steps:

inputting a negative uneven-running threshold value (SW_N);

making a check as to whether an uneven-running value, which appears to be reliable, lies below this threshold value; and, when this condition is satisfied, using this data as an indication that a disturbance of the crankshaft rpm because of drive train vibrations is present and interrupting the detection of misfires.

5. An arrangement for suppressing disturbances when detecting misfires in an internal combustion engine, the arrangement comprising:

first computation means for computing uneven-running values which are a measure for the changes of the crankshaft rpm of the engine which are caused by misfires;

second computation means for computing the spacing W between bands of uneven-running values;

a memory which inputs an uneven-running threshold value (SW_P or SW_0), a threshold spacing (W_SW_P or W_SW_0) and a negative uneven-running threshold value (SW_N) with these values being dependent in general upon the instantaneous engine operating state; and, comparator means for comparing the computed band spacing W to the pregiven threshold spacing and, in the case of a band spacing greater than the threshold spacing (W_SW_P or W_SW_O), outputting an indication as to the presence of misfires; whereas, said comparator means otherwise diagnosing a disturbance of the crankshaft rpm for a simultaneous drop below the negative uneven-running threshold value by the uneven-running values and interrupting the detection of misfires.

* * * * *

UNITED STATES PATENT AND TRADEMARK OFFICE
CERTIFICATE OF CORRECTION

PATENT NO. : 5,513,521
DATED : May 7, 1996
INVENTOR(S) : Martin Klenk and Wolfgang Wimmer It is certified that error appears in the above-identified patent and that said Letters Patent is hereby corrected as shown below:

In column 4, line 52: please delete
"c1 . LU[i] + (1 - c1). MINLU [i - 1];" and substitute
-- c1 · LU[i] + (1 - c1)· MINLU [i - 1]; -- therefor.

In column 4, line 54: please delete
"c2 . LU[i] + (1 - c2). MINLU [i - 1];" and substitute
-- c2 · LU[i] + (1 - c2)· MINLU [i - 1]; -- therefor.

In column 5, line 5: please delete
"W[i] = const . (MINLU[i] - MAXLU[i])" and substitute
-- W[i] = const · (MINLU[i] - MAXLU[i]) -- therefor.

In column 5, line 26: please delete
"W[i]=c.W[i-1]+(1-c).const.(MINLU[i]-MAXLU[i])" and substitute therefor:
-- W[i] = c · W[i - 1] + (1 - c) · const · (MINLU[i] - MAXLU[i]) --.

Signed and Sealed this

Fifteenth Day of July, 1997

Attest:

BRUCE LEHMAN

*Attesting Officer*  *Commissioner of Patents and Trademarks*